Patented May 9, 1950

2,506,572

UNITED STATES PATENT OFFICE 2,506,572

LUBRICANT COMPOSITION

John D. Bartleson, Cleveland, Ohio, assignor to The Standard Oil Company, Cleveland, Ohio, a corporation of Ohio No Drawing. Application April 19, 1946, Serial No. 663,630

8 Claims. (Cl. 252—32.7)

This invention relates to lubricants and lubricant additives suitable for use under various conditions, including high temperatures or high pressures, or both, as for example, use in an internal combustion engine operating at higher temperatures and in which the lubricant is in close contact with metallic surfaces, metal compounds and high temperature gases. Lubricating oils, particularly when used under such conditions, are subject to breakdown with lacquer deposition, sludge and acid formation, and tend to cause corrosion of the bearing and other metals with which they are in contact.

It is an object of the present invention to provide an agent which may be useful itself as a lubricant, and which when added to lubricants will markedly inhibit the very objectionable deposition of lacquer, and, at the same time, inhibit acid and sludge formation, corrosion and other types of deterioration occurring under operating conditions.

A further object is the provision of lubricating oils containing a small but effective amount of such an addition agent.

Another object of this invention is to provide heretofore unknown compositions made from raw materials not heretofore used in making products of this type, together with processes for their production.

Another object is to provide a novel composition which is superior in its function to other compositions now available and intended for this same general purpose.

Other objects of this invention will be apparent as embodiments thereof are disclosed hereinafter.

The compositions of the invention relate broadly to reaction products of a phosphorus sulfide with an amine, with or without added reacted sulfur, which are converted to a nitrogenous base derivative by reaction with a nitrogen containing basic compound such as ammonia, amines, etc.

In considering the chemistry involved in the reactions pertinent to the invention, it is emphasized at the outset that it is usually accepted that one basic substance will not react with another basic substance to give a reaction product. It is also usually expected that when amines enter into reactions, the reaction products containing the amine nitrogen tend to have basic characteristics attributable to the nitrogen. Therefore, it would be expected that the reaction product obtained from the reaction of an amine for example, would not react readily with a basic nitrogen compound such as ammonia or an amine, or if it would react the amine reaction product would readily be decomposed.

Surprisingly enough, however, it has been discovered that basic nitrogeneous compounds do react with the reaction products obtained from the reactions of certain amines with a sulfide or sulfides of phosphorus to give heretofore unknown compositions containing the combined sulfide-amine and basic nitrogen radicals or groups. In addition, it has been discovered that this reaction results in good yields and is free from the high losses inherent in processes forming sludges. More complete reaction can be assured, especially with the gaseous, liquid or low melting solid nitrogen bases and little or no inorganic by-products are formed.

It has also been discovered that such compositions are suitable as lubricants and as addition agents for lubricants such as lubricating oils and greases. When employed as addition agents they impart markedly advantageous properties to the oils or greases, such as antioxidant, corrosion inhibiting and improved detergent properties, and are free from the disadvantages of high ash-containing derivatives.

If an element of the sulfur family, i. e., sulfur, selenium or tellurium, is incorporated into the product, still further improved lubricants or lubricant additives are obtained. This sulfur can be incorporated by adding elemental sulfur at any state of the preparation, i. e. by reacting sulfur with the amine and then treating with $P_2S_5$, or treating a $P_2S_5$-amine reaction product with sulfur, or treating a nitrogenous base derivative of the $P_2S_5$-amine reaction product with sulfur, the latter two being preferred. Selenium and tellurium function much the same way as sulfur in this respect and may be incorporated similarly.

The primary reaction between the amine and the phosphorus sulfide preferably is carried out first and may be carried out with direct admixture of the reactants, or by their admixture in the presence of a diluent which may or may not be subsequently removed. A volatile inert solvent, such as a saturated hydrocarbon boiling in the desired temperature range, may be used as a diluent which is to be subsequently removed. If a volatile solvent is used, it may be selected so as to have a boiling point that will assist in controlling the temperature if the reaction is carried out under reflux conditions. Alternatively, a heavier oil such as white oil, or a lubricating oil of about the same properties as that to which the new composition is to be added, may be used as a diluent which is not to be removed. In a commercial embodiment of the invention, a diluent probably would not be used unless it is a mineral oil, since a diluent is not necessary.

The amine or mixture of amines may be reacted with the sulfide or mixture of sulfides in mol ratios of one mol of amine to from 0.5 to 2.5 or more mols of sulfide. The unexpectedly large amount of the sulfide which can be consumed in the reaction is believed to be unique. Even small amounts show a significant improvement. Ecomomic factors may make it undesirable to use more than about 2.5 mols of the sulfide. Generally about 0.7 to 2.2 mols is the usual range that will be used, and about 1.0 to about 1.5 is especially desirable.

The pentasulfide is preferred although other phosphorus sulfides or mixtures of sulfides may be employed. Phosphorus pentasulfide is most economic and readily available and for this reason is used in the illustrative examples. Under suitable conditions sulfides of arsenic or antimony may be similarly employed.

A very large variety of amines have been found to react, for example, either aliphatic, aromatic or heterocyclic primary or secondary amines or derivative primary or secondary amines thereof; all of these contain at least one amine hydrogen, which is a hydrogen attached directly to the nitrogen. The choice may be controlled by the desired lubricant solubility characteristics of the primary sulfide-amine or the final base derivative product. Primary and secondary aliphatic amines which have an aliphatic radical of at least twelve carbon atoms are preferred, and of these the mono- or di-octadecyl or hexadecyl amines or mixtures containing at least one of them are given as illustrative. Analogous polyamines may be used. Commercial dioctadecylamine is a commercially available amine and for this reason is used in many of the illustrative examples.

The amine stock may be a mixture of different amines of different molecular weight and degrees of substitution and containing unsaturated or saturated radicals. Tertiary amines, or lower primary, secondary, or tertiary amines containing less than twelve carbon atoms may be present.

The yield is very high and appreciable amounts of oil insoluble products are not formed. Generally the amount of sulfide is chosen so that it will all react at the temperature selected, and the reaction is continued until it is consumed.

The sulfide-amine reaction may be carried out under a temperature within a wide range, e. g., a temperature in the range of about 100° to an upper temperature which should not be so high as to decompose the reaction product, and 600° F. may be viewed as a practical upper limit, although much higher temperatures produce a satisfactory product. Associated with a higher temperature treatment of above about 400° F. is the evolution of sulfur containing gas, for instance $H_2S$, and a primary reaction product which is more oil soluble than a lower temperature product.

The reaction time varies somewhat with the amine and the temperature and falls within the general range of from 1 minute to about 6 hours, desirably from about ¼ to about ¾ hours and preferably about ½ hour. The reaction is usually complete in four hours or less time. The reaction time is a function of the temperature, the amount of the sulfide that is to react, the subdivision of the sulfide, rate of stirring, etc. The reaction is somewhat exothermic and on a commercial scale the heat evolved thereby may be used to maintain the temperature. The ingredients may be added in increments if this is desirable for temperature control or for other reasons.

To achieve the additional improvement which results if additional sulfur is present in the additive, about 0.01 to 2.0 and preferably 0.1 to 0.7 gram atoms of sulfur per gram mol of the amine is desirable. This sulfur can be incorporated by adding elemental sulfur, preferably after the formation and cooling of the primary reaction product, and maintaining the mass at about 200° to 300° F. for about a few minutes to several hours, and preferably about one hour. Selenium and tellurium function in much the same way as sulfur in this respect, and may be incorporated similarly. The sulfur can also be added after the basic nitrogenous derivatives are formed, if desired.

The reactions may be carried out in the absence of air or in an atmosphere of an inert gas, such as nitrogen.

The primary sulfide-amine reaction products, with or without an added element of the sulfur family, may be converted to their nitrogen base derivatives by reaction with one or more basic nitrogenous compounds such as ammonia, amines or heterocyclic nitrogenous bases. Generally, ammonia and the gaseous or liquid amines or nitrogenous organic compounds are preferred. The organic nitrogenous bases may be one or more of the following: mono-, di- or tri-alkyl, aryl, or mixed alkyl aryl amines wherein the alkyl or aryl groups may be methyl, ethyl, propyl, isopropyl, butyl, isobutyl, secondary butyl, normal pentyl, a secondary pentyl, isopentyl, hexyl, cyclohexyl, phenyl, methylphenyl, a dimethylphenyl, a trimethylphenyl, or the like. The heterocyclic bases may be typified by pyridine, a lower alkyl substituted pyridine where the alkyl may be an ethyl, methyl, or propyl group, quinoline, isoquinoline, and the like. Polyamines may be used similarly, e. g. ethylene diamine, diethylene triamine, and the like.

The reaction of forming the nitrogen base derivative of the primary sulfide-amine reaction product may be carried out at room temperatures or above, depending upon the boiling point or the melting point of the nitrogenous bases used. In the case of volatile amines or ammonia, room temperature is preferred. In the case of a liquid nitrogenous base, a higher temperature may be used although the temperature preferably should not be above the boiling point of the nitrogenous base. For a normally solid nitrogenous base, temperatures above its melting point are preferred, but the temperature should not be above the boiling point thereof. Atmospheric or elevated pressures may be used and in the case of the more volatile nitrogen bases, an elevated pressure is preferred. This reaction is also completed in four hours or less time and the same factors as to reaction time are involved as discussed heretofore. A diluent may be used as described heretofore but is not necessary. If a diluent is used in the sulfide-amine reaction, it may be carried over into this reaction step and may be subsequently separated, if desired. In general, it is preferred to prepare the primary reaction product in one step, and to prepare its nitrogen base derivative in a separate step.

However, if desired, a one-step process of preparing the final product may be used.

From about 0.25 to about 6.0 equivalents of the nitrogenous base may be used per mol of the sulfide in the sulfide-amine reaction product, preferably about 1 to about 4 equivalents. An equivalent is the quotient of a mol divided by the valence of the nitrogenous base concerned.

It is beneficial to have water present in the above second reaction step and this may be introduced as a hydrate of the nitrogenous base or it may be introduced separately.

A plurality of nitrogenous bases can be used, such as ammonia, saturated or unsaturated aliphatic naphthenic or aromatic or mixed nitrogenous bases. If the amount of the nitrogenous base is small, the final product may be a mixture of the initial reaction product and the nitrogenous base derivative. It is preferred to introduce a relatively large amount of the basic nitrogenous compound into the initial reaction product as desirable properties are attributed to the nitrogen base derivative.

The yield in this second reaction step is very high, and in many cases it is about 100%.

A particular advantage of the nitrogenous base derivatives of the invention is that no combustion chamber deposits are formed when these are used in lubricants for internal combustion engines. The compounds burn substantially completely to a substantially ash-free product, so there is substantially no ash which may scratch moving parts in the engine.

Where the presence of a metal is not objectionable or when a smaller amount of ash is desired, mixed nitrogen bases and metal derivatives of the sulfide-amine reaction products may be used. In such a combination, the capacity of the primary reaction product to react with a basic component may be fully satisfied without raising the ash above a maximum wanted low value. One or a plurality of metals can be used with one or more nitrogenous bases in such products. These metals are typified by sodium, calcium, barium, zinc, aluminum, or tin; or combinations of two or more of these metals with one or more basic nitrogenous materials such as ammonia, amines or heterocyclic compounds, in the final derivative.

After the reactants have all entered into solution, the reaction is complete. The reaction mass is then centrifuged or filtered to remove water and any traces of oil insoluble by-products. If a volatile solvent is used as a diluent, it may be removed by vacuum distillation. The final products are usually waxy solids or colored oils at room temperatures or above.

These new compositions impart many desirable properties to lubricants to which they have been added. They act as detergents therein, and also as inhibitors of corrosion and lacquer and sludge formation.

The amount of the above described nitrogenous base derivatives of sulfide-amine reaction products to be added to an oil or grease will depend upon the characteristics of the oil or grease and intended use. Some oils have more of a tendency to corrode metals, or to form acids, sludges and lacquer deposits than others, and such oils require larger quantities of the addition agent. Also, oils that are intended for higher temperatures require larger amounts of the additive. In general, for lubricating oils the range is from 0.25% to 10% by weight, but under some circumstances amounts as low as 0.01% show a significant improvement. As to an upper limit, it will be uneconomical to add more than is necessary to impart to the lubricant the desired properties. Generally, not over 50% would be used, although since the new materials are lubricants, even 100% thereof could be used.

The following examples of the preparation of new compositions in accordance with the invention and tables of results of tests of lubricants comprising some of such compositions will serve to illustrate and point out some advantages but in no wise to limit the scope of the invention as otherwise disclosed and claimed herein.

Example 1

(a) 800 grams of commercial dioctadecylamine (a mixture of about three parts by weight of dioctadecylamine and one part of trioctadecylamine), 281 grams of phosphorus pentasulfide, 1200 grams of No. 225 Red Oil (a conventional acid treated Mid-Continent lubricating oil base stock of S. A. E. 20) and 1200 grams of No. 300 Red Oil (a conventional acid treated Mid-Continent lubricating oil base stock S. A. E. 30 or slightly lower) were mixed and heated to 500° F. and maintained at this temperature for 30 minutes. A considerable amount of gas which largely consisted of $H_2S$ was evolved.

(b) 16 grams of sulfur was added to the reaction mass and the reaction mass maintained at 200° F. for one hour, then the product was decanted. The reaction mass lost 116 grams in weight during these reactions. The decanted product (an about 25% solution of the additive in the Red oil) analyzed 3.95 weight percent S and 0.65 weight percent N.

(c) Gaseous ammonia was bubbled through 200 grams of the above product (b) at room temperature for one hour, and then gaseous nitrogen was bubbled through the reaction mass for four hours to remove any unreacted ammonia therein. There was an increase in weight of the product of three grams due to the ammonia reacted. The product (a solution of the ammonia derivative in the Red Oil) analyzed 1.16 weight percent nitrogen. Complete reaction is indicated both by the increased weight and the nitrogen content of the final product.

Example 2

(a) A primary sulfide-amine reaction product was prepared as in Example 1(a).

(b) To 2638.5 grams of the product (a) 170 grams of water was added and the mixture heated for one hour at 200° F. It was then blown with air for two hours at 200° F., then one hour at 250° F. and then cooled. 20.5 grams of ammonia was bubbled into the mixture over a period of about six hours at room temperature.

(c) 12.6 grams of sulfur was added to the reaction mass (b) and the resulting mass maintained at 300° F. for one hour.

Example 3

(a) A primary sulfide-amine reaction product was prepared as in Example 1(a).

(b) 200 grams of the above product (a) was mixed with 19 grams of commercial mixed amyl amines and the mixture maintained at 250° F. for four hours. Complete reaction occurred.

In order to demonstrate the properties of the nitrogen base derivatives of the new phosphorus sulfide-amine reaction products in improving the characteristics of lubricating oils, a large number of representative additives were incorporated into conventional lubricating oils. The lubricating oils containing these additives were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September, 1941, and in another paper by the same authors presented at the New York city meeting of the American Chemical Society in September, 1944, published in: Industrial and Engineering Chemistry, Analytical edition, vol. 17, No. 5, May, 1945, pages 302–309. The latter paper also correlates the results of such laboratory tests with the so-called standardized "Chevrolet engine test."

Essentially the laboratory test equipment consists of a vertical thermostatically heated, large glass test tube, into which is placed a piece of steel tubing of about one-third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "standard" test the temperature used is approximately the average temperature of the crankcase. The rate of air flow per volume of oil is adjusted to the same as the average for a test engine in operation. Of the catalytic effects, those due to iron are the most important. They are empirically duplicated by the addition of a soluble iron salt. Those due to lead-bromide are duplicated by its addition. In the "standard" test, 0.012% of iron salt is added; and in the "iron tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following tables were obtained from tests using:

A 160 cubic centimeter sample of the lubricant composition
70 liters of air per hour
100 square centimeters of steel surface
4.4 square centimeters of copper-lead surface
1.0 square centimeter of copper surface
0.01% by weight of lead bromide powder
0.05% soluble iron calculated as $Fe_2O_3$ (ferric 2-ethyl hexoate in C. P. benzene)

The "iron tolerance" tests were run at 280° F. for 36 hours. The lacquer is deposited on the steel tube and is determined by difference in weight of the tube after washing with chloroform and drying to constant weight. The corrosion was determined by difference in weight of the copper and heavy metal pieces after scrubbing with chloroform. The used oil was sufficient to enable the determination of all of the usual oil tests, viz. isopentane insolubles, viscosity, acid number, etc.

The data in the following tables show the results obtained in testing our new additives by the tests described.

"Iron tolerance" tests on a conventional Mid-Continent solvent extracted lubricating oil base stock (S. A. E. 30) and compositions containing this oil and nitrogenous base derivatives of phosphorus pentasulfide-amine reaction products of the invention were run for a number of additives. The results given in the following tables are representative.

*Table I*

| Additive From Example No. | None | 1 (c) | 3 (b) |
|---|---|---|---|
| Concentration of Additive in percent by weight | None | 0.5 | 0.5 |
| Lacquer Deposit (in milligrams) | 1.2 | 0.0 | 0.0 |
| Sludge (isopentane insoluble in milligrams) | 206.4 | 14.9 | 97.9 |
| Corrosion (in milligrams) weight loss of: | | | |
| Copper | 3.3 | 0.5 | 0.8 |
| Copper-lead | 16.2 | 1.7 | 3.4 |
| Acid Number | 14.5 | 2.6 | 4.3 |
| Viscosity Increase (SUS) | 1,095 | 282 | 393 |

These data show the marked improvement imparted to the lubricating oil by the nitrogenous base derivatives of the invention in every indicated characteristic. The complete elimination of lacquer is particularly noteworthy, as is also the very great reduction in corrosion and sludge formation, especially when the small amount of the additive (0.5%) is considered.

The effectiveness of the new additive test was confirmed by the standard "Chevrolet engine test" for testing lubricating oils.

In the Chevrolet engine test, the engine is a conventional Chevrolet engine with 216.5 cu. in. piston displacement and a compression ratio of 6.5 to 1. Prior to each test new piston rings and two new copper-lead bearing inserts are installed. The engine is operated at 3150 R. P. M. with a load of 30 B. H. P. and at a temperature at the jacket outlet of 200° F. The lubricating oil temperature is maintained at 265° F. for an S. A. E. 10 grade oil, and at 280° F. for oils of S. A. E. 30 to 50 grades. The fuel used contains from 2.5 to 3.0 ml. tetraethyl lead per gallon. Besides the weight loss of the test bearings, deposits in the power section, and properties of the used oil, samples near the middle and also at the end of the test are examined.

It can be seen that the engine test is a slow and expensive test and that a laboratory test is the more practical way of testing a large number of samples in a relatively short time. However, an engine test was made on solvent extracted oil containing 1% by weight of the ammonia derivative of Example 2 in order to confirm the laboratory test data.

The following 25 hour Chevrolet test data is illustrative of the improvement imparted to a solvent extracted Mid-Continent base lubricating oil:

Engine rating:
    Skirt rating _____ 10.0
    Varnish rating (total) _____ 49.5
    Sludge rating (total) _____ 49.0

Overall _____ 98.5
    Bearing corrosion, mgms./bearing half shell _____ 368.1
Used oil rating (25 hour sample):
    Viscosity increase _____ 83.
    Pentane insolubles _____ 32.8
    Acid number _____ 1.04

These data are very striking. The skirt rating is perfect. The overall sludge and varnish rating is well above the usually accepted values for a good lubricant. This is very impressive for an additive which is ash-free, since additives of this type are not usually thought of as having the excellent detergent properties shown by the additive comprising this invention. The corrosion seems low when one keeps in mind that the base oil is one which shows a corrosion of as high as 2000 mgms./bearing half shell. The used-oil test values show very low deterioration.

In order to prevent foaming of the oil containing a small proportion of the additive, it is desirable in some cases to add a very small amount of tetra-amyl silicate, or an alkyl ortho carbonate, ortho formate or ortho acetate. 0.0003% of polyalkylsilicone oil, or 0.001% of tetra-amyl silicate was found to prevent foaming upon bubbling of air through oil containing a few per cent of the additive.

It will be obvious to one skilled in the art that nitrogen base derivatives of sulfide-amine reaction products and similar products obtained by introducing phosphorus and/or sulfur into an amine as prepared according to different procedures but having substantially the same properties as those herein described, may be made up into lubricant compositions in accordance with the invention. The invention as claimed contemplates such compositions broadly, as come within the following claims.

I claim:

1. A mineral lubricating oil containing an amount of an additive to inhibit corrosion, lacquer and sludge formation when the oil is used in an internal combustion engine, said additive being the reaction product of 0.5 to 2.5 mols of phosphorus pentasulfide and one mol of an octadecylamine having at least one hydrogen directly attached to the nitrogen at a temperature in the range of 400° to 600° F. for a time in the range of 1 minute to 6 hours, and reacting therewith an amount of ammonia within the range of 0.25 to 6.0 equivalents per mol of the phosphorus sulfide, to form an oil dispersible reaction product suitable for addition to a lubricating oil.

2. A mineral lubricating oil containing an amount of an additive to inhibit corrosion, lacquer and sludge formation when the oil is used in an internal combustion engine, said additive being the reaction product of 0.5 to 2.5 mols of phosphorus pentasulfide and 1 mol of a saturated amine having at least one hydrogen directly attached to the nitrogen and having at least one radical of at least 12 carbon atoms, at a temperature in the range of 400° to 600° F. for a time in the range of 1 minute to 6 hours, and reacting therewith an amount of ammonia within the range of 0.25 to 6.0 equivalents per mol of the phosphorus sulfide, and reacting therewith an amount of added sulfur within the range of 0.01 to 2.0 gram atoms per gram mol of the amine at a temperature in the range of 200° to 300° F., to form an oil dispersible reaction product suitable for addition to a lubricating oil.

3. A mineral lubricating oil containing an amount of an additive to inhibit corrosion, lacquer and sludge formation when the oil is used in an internal combustion engine, said additive being the reaction product of 0.5 to 2.5 mols of phosphorus pentasulfide and 1 mol of a saturated amine having at least one hydrogen directly attached to the nitrogen and having at least one radical of at least 12 carbon atoms at a temperature in the range of 400° to 600° F. for a time in the range of 1 minute to 6 hours, and reacting therewith an amount of ammonia within the range of 0.25 to 6.0 equivalents per mol of the phosphorus pentasulfide, to form an oil dispersible reaction product suitable for addition to a lubricating oil.

4. An additive suitable for addition to a mineral lubricating oil to inhibit corrosion, lacquer and sludge formation when the oil is used in an internal combustion engine, said additive being the reaction product of 0.5 to 2.5 mols of phosphorus pentasulfide and one mol of a saturated amine having at least one hydrogen directly attached to the nitrogen and having at least one radical of at least 12 carbon atoms at a temperature in the range of 400° to 600° F. for a time in the range of 1 minute to 6 hours, and reacting therewith an amount of ammonia within the range of 0.25 to 6.0 equivalents per mol of the phosphorus pentasulfide, to form an oil dispersible reaction product suitable for addition to a lubricating oil.

5. A mineral lubricating oil containing an amount of an additive to inhibit corrosion, lacquer and sludge formation when the oil is used in an internal combustion engine, said additive being the reaction product of 0.5 to 2.5 mols of a phosphorus sulfide and one mol of an octadecylamine having at least one hydrogen directly attached to the nitrogen at a temperature in the range of 400° to 600° F. for a time in the range of 1 minute to 6 hours, and reacting therewith an amount of a nitrogen base within the range of 0.25 to 6.0 equivalents per mol of the phosphorus sulfide, to form an oil dispersible reaction product suitable for addition to a lubricating oil.

6. A mineral lubricating oil containing an amount of an additive to inhibit corrosion, lacquer and sludge formation when the oil is used in an internal combustion engine, said additive being the reaction product of 0.5 to 2.5 mols of a phosphorus sulfide and 1 mol of a saturated amine having at least one hydrogen directly attached to the nitrogen and having at least one radical of at least 12 carbon atoms at a temperature in the range of 400° to 600° F., for a time in the range of 1 minute to 6 hours, and reacting therewith an amount of a nitrogen base within the range of 0.25 to 6.0 equivalents per mol of the phosphorus sulfide, and reacting therewith added sulfur in an amount within the range of 0.01 to 2.0 gram atoms per gram mol of the amine at a temperature in the range of 200° to 300° F., to form an oil dispersible reaction product suitable for addition to a lubricating oil.

7. An additive suitable for addition to a mineral lubricating oil to inhibit corrosion, lacquer and sludge formation when the oil is used in an internal combustion engine, said additive being the reaction product of 0.5 to 2.5 mols of a phosphorus sulfide and 1 mol of a saturated amine having at least 12 carbon atoms in the molecule and having at least one hydrogen directly attached to the nitrogen at a temperature in the range of 100° to 600° F. for a time in the range of 1 minute to 6 hours, and reacting therewith an amount of a nitrogen base within the range of 0.25 to 6.0 equivalents per mol of the phosphorus sulfide, to form an oil dispersible reaction product suitable for addition to a lubricating oil.

8. A mineral lubricating oil containing an amount of an additive to inhibit corrosion, lacquer and sludge formation when the oil is used in an internal combustion engine, said additive being the reaction product of reacting 0.5 to 2.5 mols of a phosphorus sulfide and 1 mol of a saturated amine having at least 12 carbon atoms in the molecule and at least one hydrogen directly attached to the nitrogen at a temperature in the range of 100° to 600° F. and reacting therewith an amount of a nitrogen base within the range of 0.25 to 6.0 equivalents per mol of the phosphorus sulfide, to form an oil dispersible reaction product suitable for addition to a lubricating oil.

JOHN D. BARTLESON.

REFERENCES CITED

The following references are of record in the file of this patent:

UNITED STATES PATENTS

| Number | Name | Date |
|---|---|---|
| 2,146,584 | Lipkin | Feb. 7, 1939 |
| 2,272,205 | Hughes | Feb. 10, 1942 |
| 2,393,934 | Reiff et al. | Jan. 29, 1946 |
| 2,403,474 | Bartleson et al. | July 9, 1946 |
| 2,403,894 | Bartleson | July 9, 1946 |
| 2,419,153 | Musselman | Apr. 15, 1947 |

Certificate of Correction

Patent No. 2,506,572                                      May 9, 1950

JOHN D. BARTLESON

It is hereby certified that error appears in the printed specification of the above numbered patent requiring correction as follows:

Column 8, line 30, after the word "additive" strike out "test";

and that the said Letters Patent should be read with this correction therein that the same may conform to the record of the case in the Patent Office.

Signed and sealed this 22nd day of August, A. D. 1950.

[SEAL]

THOMAS F. MURPHY,
*Assistant Commissioner of Patents.*